United States Patent
Walkling et al.

(10) Patent No.: US 9,292,556 B2
(45) Date of Patent: Mar. 22, 2016

(54) SEARCHING A MAP DATABASE VIA A TREE OF NODES HAVING MULTIPLE SEARCH CRITERIA AND FILTER ITEMS WITHIN A NON TERMINAL NODE

(75) Inventors: Uwe Walkling, Barfelde (DE); Holger Listle, Hidesheim (DE); Ralf Osmers, Hidesheim (DE); Joerg Krewer, Pattensen (DE); Stefan Lueer, Hidesheim (DE); Andreas Zosel, Hidesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1416 days.

(21) Appl. No.: 12/161,666

(22) PCT Filed: Dec. 27, 2006

(86) PCT No.: PCT/EP2006/070230
§ 371 (c)(1),
(2), (4) Date: May 22, 2009

(87) PCT Pub. No.: WO2007/082632
PCT Pub. Date: Jul. 26, 2007

(65) Prior Publication Data
US 2009/0299995 A1 Dec. 3, 2009

(30) Foreign Application Priority Data
Jan. 17, 2006 (DE) .......................... 10 2006 002 113

(51) Int. Cl.
G06F 17/30 (2006.01)

(52) U.S. Cl.
CPC ................................ G06F 17/30327 (2013.01)

(58) Field of Classification Search
CPC ..................... G06F 17/30327; G06F 17/30321
USPC .................................. 707/736, 758, 777, 778
See application file for complete search history.

(56) References Cited

U.S. PATENT DOCUMENTS

| 5,857,196 A * | 1/1999 | Angle et al. ........... 707/999.003 |
| 6,216,132 B1 * | 4/2001 | Chandra et al. ........ 707/999.103 |
| 6,453,315 B1 * | 9/2002 | Weissman et al. ..... 707/999.003 |
| 6,950,743 B2 * | 9/2005 | Kainuma et al. .......... 340/995.14 |
| 2002/0059593 A1 * | 5/2002 | Shao et al. ....................... 725/37 |
| 2004/0039523 A1 * | 2/2004 | Kainuma et al. .............. 701/208 |

FOREIGN PATENT DOCUMENTS

| EP | 0 623 870 | 11/1994 |
| EP | 1 158 794 | 11/2001 |

\* cited by examiner

*Primary Examiner* — Vincent F Boccio
(74) *Attorney, Agent, or Firm* — Kenyon & Kenyon LLP

(57) ABSTRACT

A method and a device are provided for outputting data records on the basis of input data records entered by a user, a set of data records present in a database being structured via a tree structure, and search criteria and filter information items being assigned to nodes in the tree structure which are not terminal nodes.

11 Claims, 4 Drawing Sheets

SEARCHING A MAP DATABASE VIA A TREE OF NODES HAVING MULTIPLE SEARCH CRITERIA AND FILTER ITEMS WITHIN A NON TERMINAL NODE

This application is a 371 of PCT/EP06/70230 Dec. 27, 2006.

FIELD OF THE INVENTION

The present invention relates to a method for outputting data records on the basis of input data records entered by a user and to a device therefor.

BACKGROUND INFORMATION

In particular, in navigation systems for motor vehicles having digital maps, databases are used which contain, for example, destination information as data records. In navigation systems, for example, different geographic objects which are selectable by a user are stored as data records of this type, the user entering input data records for this purpose to filter out or select the data records of interest to him from the set of data records.

In the case of navigation systems, it is particularly important for the user to enter information items as input data records for the purpose of having one or more matching destination data records output, thereby making it possible to select an intended destination. This function of navigation systems is typically implemented by using a directory or multiple directories. A directory is a secondary data structure whose purpose is to speed up access to other primary data structures in the same database. There are a number of options for generating directories of this type, for example a tree structure.

One example of a directory is the "point of interest" directory in navigation systems, which is a name directory for such "points of interest" (POI). Databases of navigation systems may contain millions of these points of interest as data records. It is therefore advantageous for the user to quickly select the point of interest he is looking for from the large number of stored points of interest. This can be done by searching all database contents on the basis of the input data entered by the user. However, this takes a relatively long time, which means that this method is not expedient for the user. The POI data in current navigation systems are therefore additionally contained in a global name directory which links at least some names to the points of interest which have these names.

In today's navigation systems, data records, such as points of interest in a region or a country, are searched using a search criterion. A search criterion of this type is, for example, the name. The names of all data records are therefore stored in a directory having a tree structure. However, the ability to additionally filter the data records with regard to other filter criteria, for example according to a "point of interest" category (POI category), would be desirable. For this purpose, however, another tree structure would be needed for the other filter criterion, which, however, would mean that a global search of all data records would no longer be possible within an acceptable amount of time, since all tree structures would have to be combined.

SUMMARY OF THE INVENTION

An object of the exemplary embodiments and/or exemplary methods of the present invention is to provide a method which enables data records to be quickly searched and output on the basis of input data records entered by the user and to provide a device therefor.

According to the exemplary embodiments and/or exemplary methods of the present invention, the object with respect to the method is achieved by the features of claim 1. The object with respect to the device is achieved by the features of claim 11.

Advantageous refinements are described in the particular subclaims.

The exemplary embodiments and/or exemplary methods of the present invention is explained in greater detail below on the basis of an exemplary embodiment with reference to the drawings.

DETAILED DESCRIPTION

Figure 1:
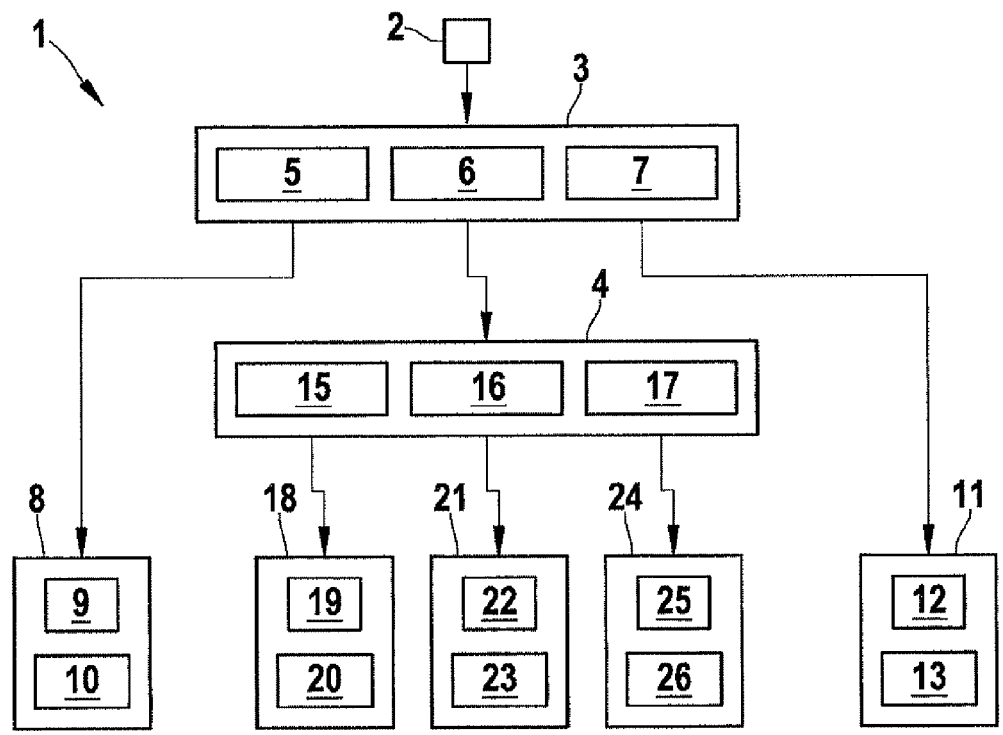
FIG. 1 shows a tree structure according to the related art.

FIG. 1 schematically shows a tree structure 1 according to the related art. This tree structure 1 is a search criterion-based tree structure in which search criteria are applied in nodes 3, 4 upon the entry of an input data record 2 for the purpose of ascertaining one or more result data records. Three search criteria 5, 6, 7, which are applied to the input data record, are stored in node 3.

If input data record 2 meets search criterion 5, the method moves on as a result to node 8 containing result data record 9, 10. Node 8 has name information 9, which is designated Name_1, and additional information 10, which is designated Information_1.

If the input data record meets search criterion 7, the method moves on as a result to node 11 containing result data record 12, 13. Node 11 has name information 12, which is designated Name_5, and additional information 13, which is designated Information_2.

If input data record 2 meets search criterion 6, the method moves on as a result to node 4 in which, in turn, three search criteria 15, 16, 17 are present and are applied.

If the input data record also meets search criterion 15, the method moves on as a result to node 18 containing result data record 19, 20. Node 18 has name information 19, which is designated Name_2, and additional information 20, which is designated Information_2.

If the input data record also meets search criterion 16, the method moves on as a result to node 21 containing result data record 22, 23. Node 21 has name information 22, which is designated Name_3, and additional information 23, which is designated Information_3.

If the input data record also meets search criterion 17, the method moves on as a result to node 24 containing result data record 25, 26. Node 24 has name information 25, which is designated Name_4, and additional information 26, which is designated Information_1.

It is therefore apparent that two data records which have additional information Information_1, two data records which have additional information Information_2, and one data record which has additional information Information_3 are ascertainable as the result. However, it is not possible to enter the additional information as a further criterion and thereby enable an associated filtering function.

Figure 2:
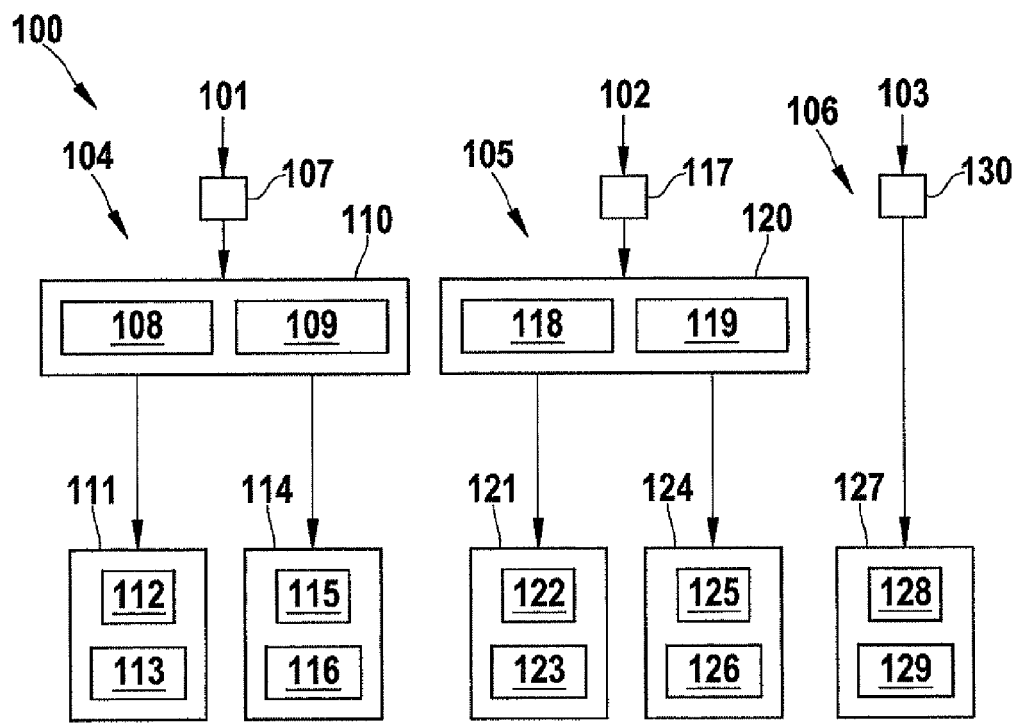
FIG. 2 shows a tree structure according to the related art.

FIG. 2 shows a tree structure 100 which is represented as a search criterion-based tree structure, tree structure 100 being divided into different tree substructures 104, 105, 106 on the basis of additional information items 101, 102, 103.

If input data record 107 in tree substructure 104 meets search criterion 108 in node 110, the method moves on as a result to node 111 containing result data record 112, 113. Node 111 has name information 112, which is designated Name_1, and additional information 113, which is designated Information_1.

If input data record 107 in tree substructure 104 meets search criterion 109 in node 110, the method moves on as a result to node 114 containing result data record 115, 116. Node 114 has name information 115, which is designated Name_4, and additional information 116, which is designated Information_1.

If input data record 117 in tree substructure 105 meets search criterion 118 in node 120, the method moves on as a result to node 121 containing result data record 122, 123. Node 121 has name information 122, which is designated Name_2, and additional information 123, which is designated Information_2.

If input data record 117 in tree substructure 105 meets search criterion 119 in node 120, the method moves on as a result to node 124 containing result data record 125, 126. Node 124 has name information 125, which is designated Name_5, and additional information 126, which is designated Information_2.

If input data record 130 in tree substructure 106 meets the preset criterion of tree substructure 106, i.e., additional information 103, the method moves on as a result to node 127 containing result data record 128, 129. Node 127 has name information 128, which is designated Name_3, and additional information 129, which is designated Information_3.

However, tree structures 100 of this type are less suitable for global searches, since they would require all tree substructures to be searched, which would be very time-consuming.

Figure 3:
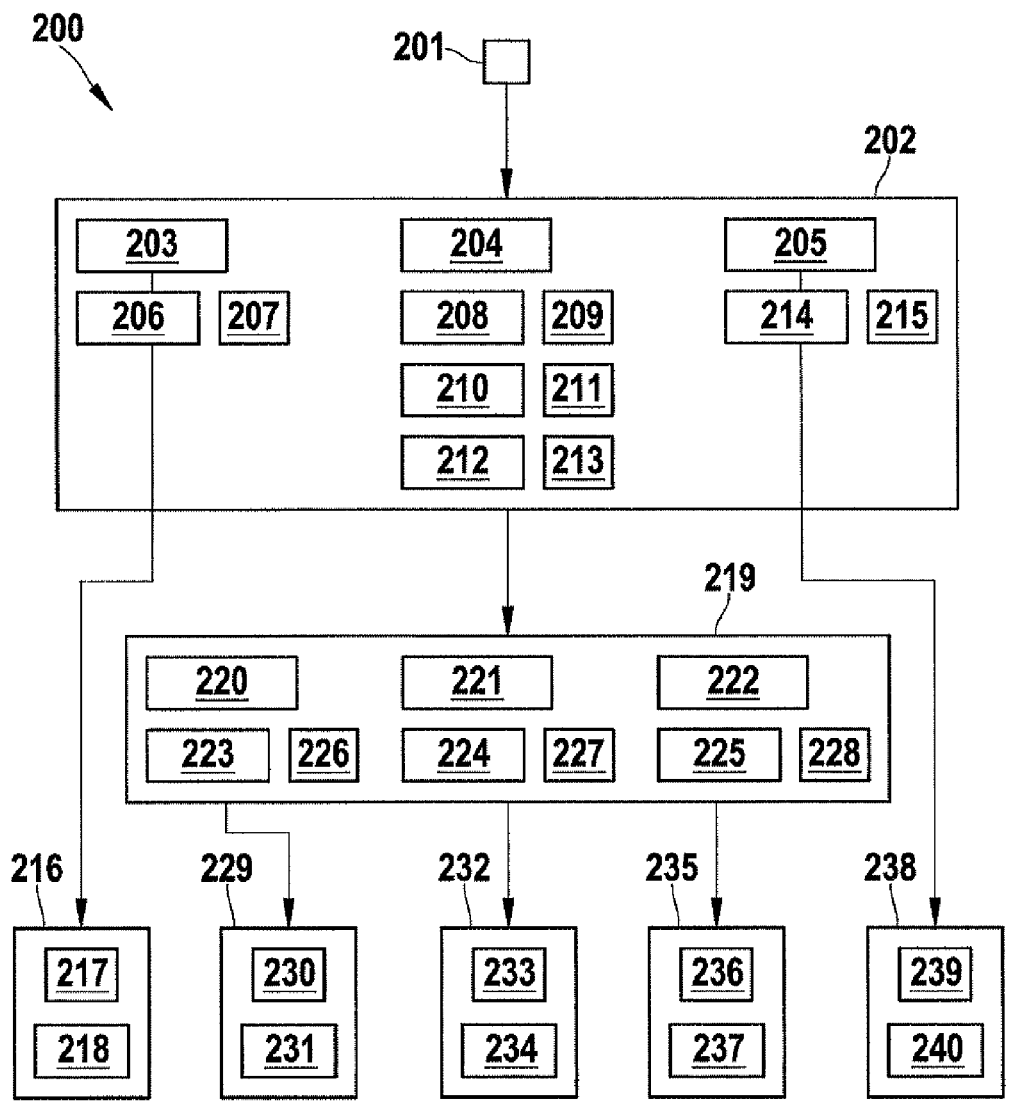
FIG. 3 shows a tree structure according to a method according to the present invention.

FIG. 3 shows a tree structure according to the exemplary embodiments and/or exemplary methods of the present invention. In this tree structure 200, a further filter information item is available in each node for the additional information being sought. Input data record 201 is applied to node 202, which has search criteria 203, 204 and 205. Search criteria 203, 204 and 205 are assigned additional filter information items 206, 208, 210, 212, 214, the filter information items also being assigned a number 207, 209, 211, 213, 215 of search criteria or filter information items in the next lower node.

If search criterion 203 and filter information item 206 are met, the method moves on as a result to node 216 containing result data record 217, 218. Node 216 has name information 217, which is identified as Name_1, and additional information 218, which is identified as Information_1. Information 218 then corresponds to filter information item 206.

If search criterion 204 and one of filter information items 208, 210, 212 are met, the method moves on as a result to node 219. This node 219 has search criteria 220, 221 and 222. Search criteria 220, 221 and 222 are assigned additional filter information items 223, 224 and 225, the filter information items also being assigned a number 226, 227 and 228 of search criteria or filter information items in the next lower node.

However, filter information items 208 and 225, filter information items 210 and 223, and filter information items 212 and 224 are the same.

If input data record 201 also meets search criterion 220 containing filter information item 223, the method moves on to node 229. Node 229 has name information 230, which is designated Name_2, and additional information 231, which is designated Information_2. Information 231 then corresponds to filter information item 223.

If input data record 201 also meets search criterion 221 containing filter information item 224, the method moves on to node 232. Node 232 has name information 233, which is designated Name_3, and additional information 234, which is designated Information_3. Information 234 then corresponds to filter information item 224.

If input data record 201 also meets search criterion 222 containing filter information item 225, the method moves on to node 235. Node 235 has name information 236, which is designated Name_4, and additional information 237, which is designated Information_1. Information 237 then corresponds to filter information item 225.

If input data record 201 meets search criterion 205 containing filter information item 214, the method moves on to node 238. Node 238 has name information 239, which is designated Name_5, and additional information 240, which is designated Information_2. Information 240 then corresponds to filter information item 214.

In addition to the search criteria, so-called additional information items are thus also taken into account for data output.

Figure 4:
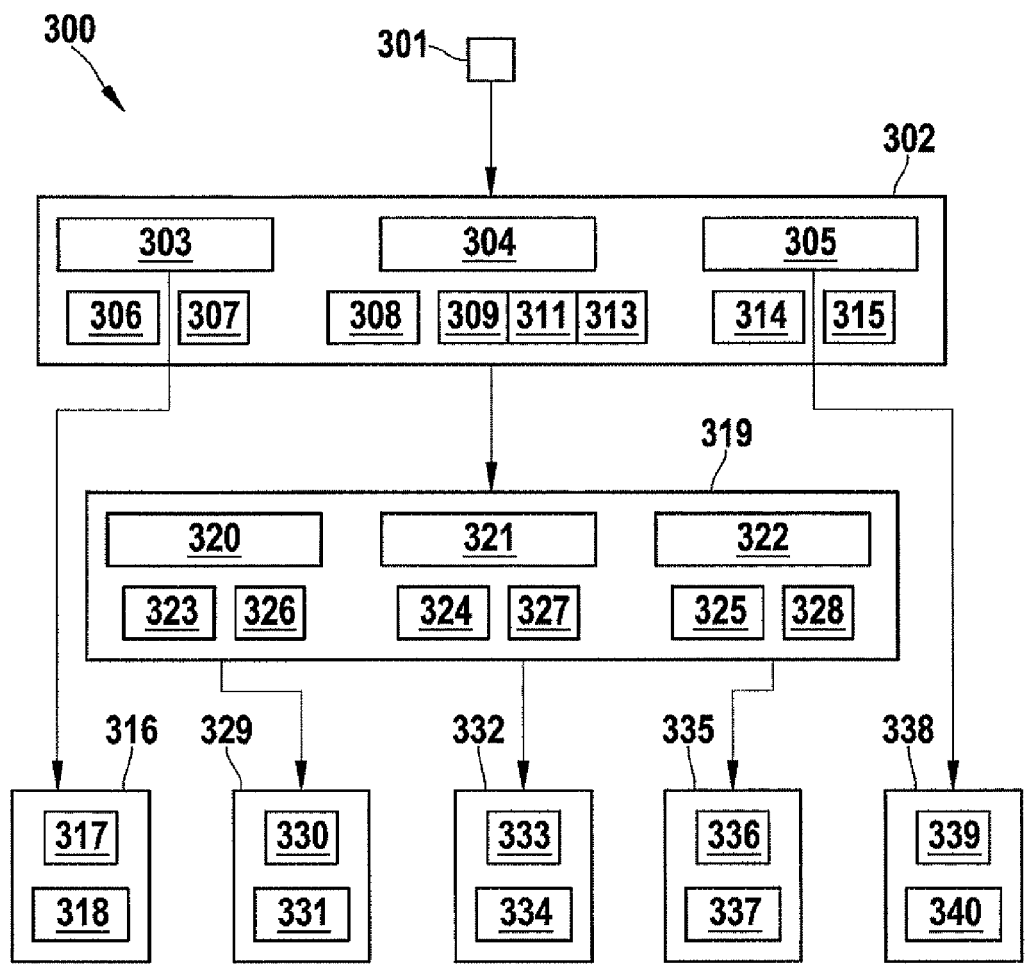
FIG. 4 shows a tree structure according to a method according to the present invention.

According to a further exemplary embodiment according to the present invention, a method according to FIG. 4 may also be represented. FIG. 4 shows a tree structure 300. In this tree structure 300, a further filter information item is available in each node for the additional item of information being sought, the filter information item being represented as a bit mask. Input data record 301 is applied to node 302, which has search criteria 303, 304 and 305. Search criteria 303, 304 und 305 are assigned additional filter information items, which are represented as bit masks 306, 308 and 314, the filter information items also being assigned a number 307, 309, 311, 313 and 315 of search criteria or filter information items in the next lower node.

If search criterion 303 and the filter information item having bit mask 306 are met, the method moves on as a result to node 316 containing result data record 317, 318. Node 316 has name information 317, which is designated Name_1, and additional information 318, which is designated Information_1. Information 318 then corresponds to the filter information item having bit mask 306.

If search criterion 304 and one of the filter information items according to bit mask 308 are met, the method moves on as a result to node 319. This node 319 has search criteria 320, 321 and 322. Search criteria 320, 321 and 322 are assigned additional filter information items as bit masks 323, 324 and 325, the filter information items also being assigned a number 326, 327 and 328 of search criteria or filter information items in the next lower node.

If input data record 301 also meets search criterion 320 containing the filter information item as bit mask 323, the method moves on to node 329. Node 329 has name information 330, which is designated Name_2, and additional information 331, which is designated Information_2. Information 331 then corresponds to the filter information item as bit mask 323.

If input data record 301 also meets search criterion 321 containing the filter information item as bit mask 324, the method moves on to node 332. Node 332 has name information 333, which is designated Name_3, and additional information 334, which is designated Information_3. Information 334 then corresponds to the filter information item as bit mask 324.

If input data record 301 also meets search criterion 322 containing the filter information item as bit mask 325, the method moves on to node 335. Node 335 has name information 336, which is designated Name_4, and additional information 337, which is designated Information_1. Information 337 then corresponds to the filter information item as bit mask 325.

If input data record 301 meets search criterion 305 containing the filter information item as bit mask 314, the method moves on to node 338. Node 338 has name information 339, which is designated Name_5, and additional information 340, which is designated Information_2. Information 340 then corresponds to the filter information item as bit mask 314.

Figure 5:
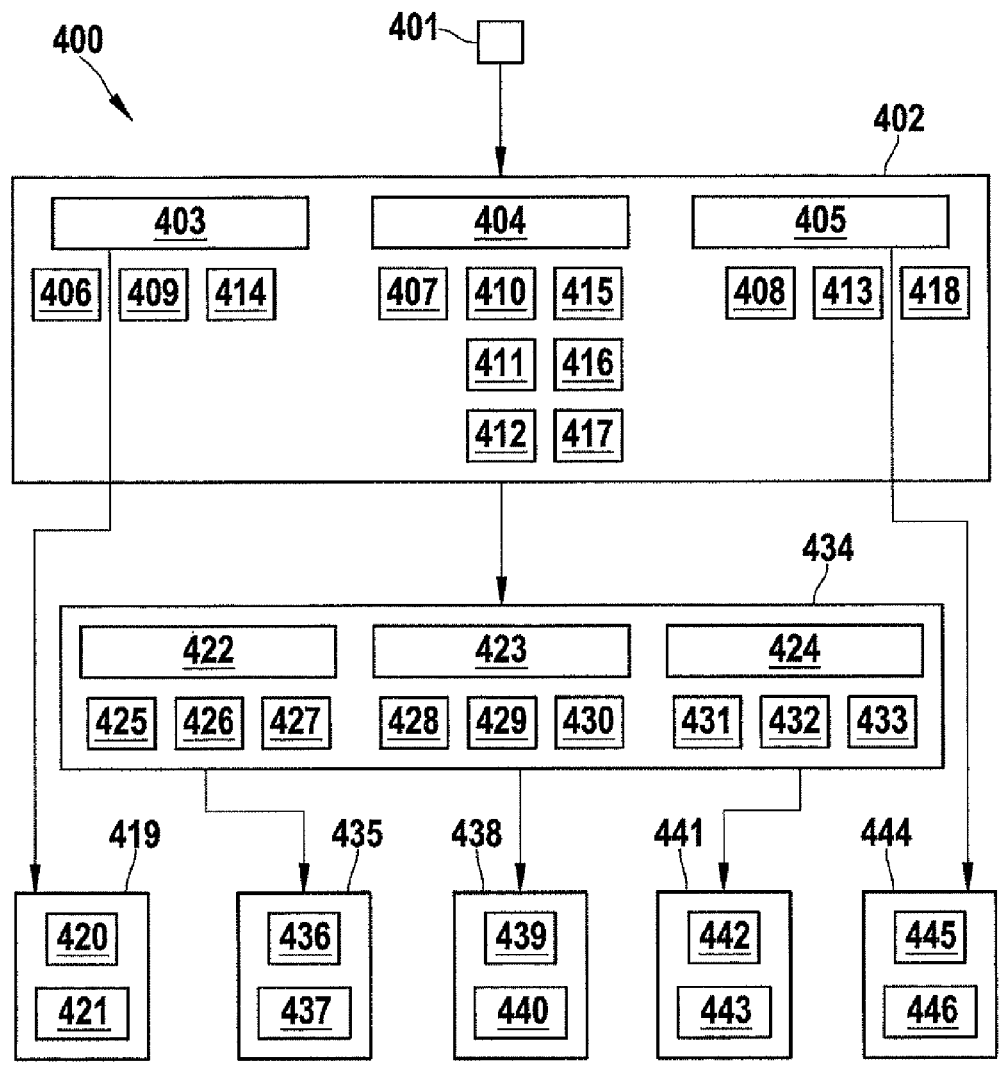
FIG. 5 shows a tree structure according to a method according to the present invention.

According to a further exemplary embodiment according to the present invention, a method according to FIG. 5 may also be represented. FIG. 5 shows a tree structure 400. In this tree structure 400, a further filter information item is available in each node for the additional information being sought, the filter information being coded by a number of filter information codes, a filter information code and a number of the information items or search criteria in the next lower node.

Input data record 401 is applied to node 402, which has search criteria 403, 404 and 405. Search criteria 403, 404 and 405 are assigned additional filter information items which are each coded via a number 406, 407, 408 of filter information codes, a filter information code 409, 410, 411, 412 and 413 and a number 414, 415, 416, 417 and 418 of the information items or search criteria in the next lower node. In the present exemplary embodiment, numbers 406, 414, 415, 416, 417, 408 and 418 are each 1 and number 407 is 3.

If search criterion 403 and the filter information item having filter information code 409 are met, the method moves on as a result to node 419 containing result data record 420, 421. Node 419 has name information 420, which is designated Name_1, and additional information 421, which is designated Information_1. Information 421 then corresponds to the filter information item having code 409.

If search criterion 404 and one of the filter information items according to filter information code 410, 411 or 412 are met, the method moves on as a result to node 434. This node 434 has search criteria 422, 423 and 424. Search criteria 422, 423 and 424 are assigned additional filter information items in coded form, the filter information item being coded by a number 425, 428 and 431 of the filter information codes, filter information codes 426, 429 and 432 and numbers 427, 430 and 433 of the information items or search criteria in the next lower node. In the present exemplary embodiment 425, 427, 428, 430, 431 and 433 are each 1.

If input data record 401 also meets search criterion 422 containing the filter information item according to code 426, the method moves on to node 435. Node 435 has name information 436, which is designated Name_2, and additional information 437, which is designated Information_2. Information 437 then corresponds to the filter information item according to code 426.

If input data record 401 also meets search criterion 423 containing the filter information item as code 429, the method moves on to node 438. Node 438 has name information 439, which is designated Name_3, and additional information 440, which is designated Information_3. Information 440 then corresponds to the filter information item according to code 429.

If input data record 401 also meets search criterion 424 containing the filter information item as code 432, the method moves on to node 441. Node 441 has name information 442, which is designated Name_4, and additional information 443, which is designated Information_1. Information 443 then corresponds to the filter information item according to code 432.

If input data record 401 meets search criterion 405 containing the filter information item according to code 413, the method moves on to node 444. Node 444 has name information 445, which is designated Name_5, and additional information 446, which is designated Information_2. Information 446 then corresponds to the filter information item according to code 413.

The methods illustrated in FIGS. 3 through 5 are based on a tree structure and supply a selected data record on the basis of an input data record, the search criteria and additional information items, it being possible to display this selected data record to the user on a display element, whereupon the user may start a further action on the basis of the displayed data record, for example locating a destination via the navigation system.

Examples of such additional information items may be countries, states, cities, parts of cities, directions, postal codes, type of point of interest, such as museums, hotels, etc.

Figure 6:
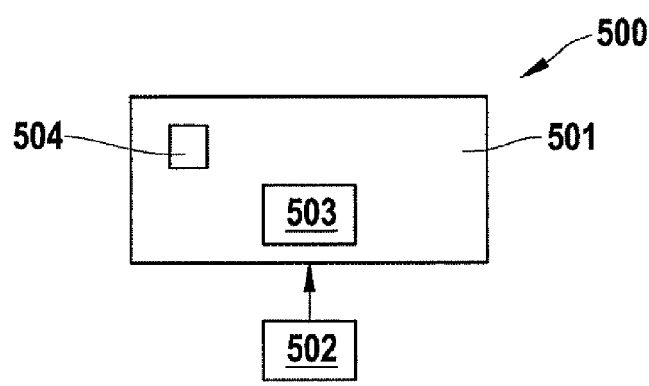
FIG. 6 shows a schematic representation of a device according to the present invention.

FIG. 6 shows, in a schematic representation 501, a device 500 according to the exemplary embodiments and/or exemplary methods of the present invention, such as a navigation system, including a memory 502, a display element 503 and at least one operating or input element 504, it being possible to enter input data and additional information items via operating or input element 504 and to carry out a method according to the present invention. The data in a database are selected according to the exemplary embodiments and/or exemplary methods of the present invention, it being possible for the data to be present in a memory 502 which may be an integrated memory or a removable memory such as a CD-ROM or a DVD.

The method according to the present invention and the device according to the present invention are not limited to navigation systems, but may also be used in other applications, such as voice input or voice processing and filtering.

What is claimed is:

1. A method for operating a vehicle navigation system having a digital map database and a processor to output data records from the digital map database based on input data records entered by the user, the method comprising:
structuring a set of data records present in the digital map database via a tree structure having nodes arranged in multiple hierarchical levels, wherein nodes of the lowest hierarchical level are terminal nodes;
assigning nodes of the tree structure, which are not terminal nodes, search criteria and filter information items, wherein each node which is not a terminal node includes multiple search criteria, and wherein each one of the multiple search criteria within a respective node which is not a terminal node is assigned multiple filter information items within the respective node which is not a terminal node, and wherein the filter information items are information for additional selection criteria, and wherein each terminal node includes (i) a first information item corresponding to a search criterion and (ii) a second information corresponding to a filter information item;
performing, by the processor, a search of the digital map database using the input data records entered by the user; and outputting, via a display unit, data records selected from the digital map database in the search.

2. The method of claim 1, wherein the search criteria are names, and wherein the filter information items include information items selected from at least one of the following categories: countries, states, cities, parts of cities, directions, postal codes, and types of point of interest.

3. The method of claim 1, wherein the filter information items are assigned to a node as a query of the additional information.

4. The method of claim 1, wherein the filter information items are assigned to a node as bit masks of the additional information items.

5. The method of claim 1, wherein the filter information items are assigned to a node as filter information codes of the additional information items.

6. The method of claim 3, wherein the filter information is also assigned an information item related to a number of one of search criteria and filter information items in a next lower node.

7. The method of claim 5, wherein the filter information is also assigned an information item related to a number of filter information codes.

8. The method of claim 1, wherein the input data records are entered by a user via an input element.

9. The method of claim 1, wherein the input data record is also an incomplete data record of one of a database and a data record set.

10. A vehicle navigation system, comprising:
a memory storing a digital map database;
a display element; and
a control unit including a hardware processor which enables data records to be output from the digital map database based on input data records entered by a user;
wherein a set of data records present in the digital map database is structured via a tree structure having nodes arranged in multiple hierarchical levels, wherein nodes of the lowest hierarchical level are terminal nodes, and wherein search criteria and filter information items are assigned to nodes in the tree structure which are not terminal nodes, and wherein each node which is not a terminal node includes multiple search criteria, and wherein each one of the multiple search criteria within a respective node which is not a terminal node is assigned multiple filter information items within the respective node which is not a terminal node, and wherein the filter information items are information for additional selection criteria, and wherein each terminal node includes (i) a first information item corresponding to a search criterion and (ii) a second information corresponding to a filter information item; and
wherein the control unit performs a search of the digital map database using the input data records entered by the user, and wherein the display element outputs data records selected from the digital map database in the search.

11. A non-transitory computer-readable data storage medium storing a computer program having program codes which, when executed on a computer, a method for operating a vehicle navigation system having a digital map database to output data records from the digital map database based on input data records entered by the user, the method comprising:
structuring a set of data records present in the digital map database via a tree structure having nodes arranged in multiple hierarchical levels, wherein nodes of the lowest hierarchical level are terminal nodes;
assigning nodes of the tree structure, which are not terminal nodes, search criteria and filter information items, wherein each node which is not a terminal node includes multiple search criteria, and wherein each one of the multiple search criteria within a respective node which is not a terminal node is assigned multiple filter information items within the respective node which is not a terminal node, and wherein each terminal node includes (i) a first information item corresponding to a search criterion and (ii) a second information corresponding to a filter information item;
performing a search of the digital map database using the input data records entered by the user; and
outputting, via a display unit, data records selected from the digital map database in the search.

* * * * *